United States Patent [19]
Sauvage

[11] Patent Number: 6,163,881
[45] Date of Patent: Dec. 19, 2000

[54] METHOD OF MONITORING THE OPERATION OF A COMPUTER

[75] Inventor: Pierre Sauvage, Notre Dame de Commiers, France

[73] Assignee: Hewlett-Packard Company, Fort Collins, Colo.

[21] Appl. No.: 08/821,743

[22] Filed: Mar. 20, 1997

[30] Foreign Application Priority Data

Apr. 10, 1996 [EP] European Pat. Off. .............. 96410034

[51] Int. Cl.[7] ...................................................... G06F 9/45
[52] U.S. Cl. .................................................................. 717/4
[58] Field of Search ................................... 395/704, 701; 714/38, 47, 46; 717/4, 1

[56] References Cited

U.S. PATENT DOCUMENTS

| | | | |
|---|---|---|---|
| 4,821,178 | 4/1989 | Levin et al. | 364/200 |
| 5,297,274 | 3/1994 | Jackson | 395/500 |
| 5,313,616 | 5/1994 | Cline et al. | 395/500 |
| 5,506,955 | 4/1996 | Chen et al. | 395/183.02 |
| 5,590,056 | 12/1996 | Barritz | 364/550 |
| 5,778,230 | 7/1998 | Wimble et al. | 395/704 |
| 5,935,262 | 8/1999 | Barrett et al. | 714/46 |

FOREIGN PATENT DOCUMENTS

0654735A1  11/1994  European Pat. Off. .

OTHER PUBLICATIONS

J. Arthur, et al, "The PVM 3.4 Tracking Facility and XPVM 1.1", IEEE, pp. 290–299, Jan. 1996.

European Search Report, EP 96 41 0034, dtd Sep. 23, 1996.

IBM Technical Disclosure Bulletin, vol. 37, No. 03, Mar. 1994, pp. 373–375, "Execution Trace Analysis of OS/2 2.DLLs Using an Intercept Layer".

IBM Technical Disclosure Bulletin, vol. 36, No. 09A, Sep. 1993, pp. 19–21, "Method of Tracing Events in Multi-threaded OS/2 Applications".

IBM Technical Disclosure Bulletin, vol. 33, No. 6B, Nov. 1990, pp. 140–141, "Tracing the Exported Entry Points in an OS/2 Dynamic Link Library".

*Primary Examiner*—Majid A. Banankhah
*Assistant Examiner*—Sue Lao

[57] ABSTRACT

A method is provided for automatically storing indications regarding conditions prevailing in a computer running a user application (1) that employs a library (2). This method involves providing an interface component (3) interposed between the user application and library. The interface component (3) is arranged to receive messages from the user application (1) destined for the library (2), pass on these messages to the library (2), and monitor and store indications regarding conditions prevailing in the computer at the time the messages are received or passed. Provision is made for dynamically changing the indications to be monitored.

9 Claims, 3 Drawing Sheets

METHOD OF MONITORING THE OPERATION OF A COMPUTER

FIELD OF THE INVENTION

The invention relates to a method for automatically storing indications regarding conditions prevailing in a computer running interacting programs such as a user application employing a library program.

BACKGROUND OF THE INVENTION

A computer or data processing machine is a machine that is able to execute a series of instructions or steps so as to perform some predetermined functions. This series of instructions or steps is usually called a program or application.

As applications of increasing complexity are developed, it has become the practice to combine together programs to produce the required functionality. FIG. 1 of the accompanying drawings illustrates a simple example where two programs 1 and 2 interact, this interaction being represented schematically by the complementary shapes of the programs 1 and 2. Program 2 is typically a library program comprising a number of routines for executing standard functions, whilst program 1 may be a user application making use of at least some of the library routines.

By way of example, program 2 may be a print library "PR.a" in binary form including, in particular, a routine PRINT. As illustrated in FIG. 2, binary print library "PR.a" is derived from a source code version "print.c" of the print library by compilation (step 10). In accordance with standard practice, "print.c" will generally include a reference to a header file "print.h" containing the function prototypes for the routines contained in the print library; in compiling "print.c", the compiler will make use of the information in the header file.

The print library will frequently only be distributed in its binary form "PR.a" together with the associated header file "print.h".

To use the PRINT routine in the library, the source code of a user application 1, such as "main.c" includes a reference to the library header file "print.h". On the program "main.c" being compiled (step 11), the information in the header file is used by the compiler in producing the binary file "object" of the user application. Of course, before the user application can be run, it must be linked (step 12) to the binary form of the print library to produce an executable program "execut". Now when the program "execut" is run, a call for the routine PRINT results in the corresponding code in the print library being executed.

A problem that frequently arises with complex applications is to understand the interaction between the different constituent programs, so as to check the correct operation of the computer and of each of the programs when they are run by the computer. This problem is notably encountered when applications are being debugged or tested and is made more difficult by the fact that the source code of library programs is frequently not available. Another problem is to trace or determine particular parameters of the computer running the application, at the time functions calls are made between different parts of the application, that is to determine the conditions prevailing in a computer running the applications. Such parameters could include the free memory area, or the number and type of available resources, or other technical features of the computer.

A prior solution to at least some of these problems is disclosed in IBM Technical Disclosure Bulletin, vol 37, no 03, March 1994, New York US, pages 373–375, "Execution Trace Analysis of OS/2 2.". However, in the solution there proposed, the required parameters to be monitored must be pre-specified. It is an object of the present invention to provide an improved monitoring method.

SUMMARY OF THE INVENTION

According to the present invention, there is provided a method of automatically storing indications regarding conditions prevailing in a computer running a first program that makes use of a second program, the method involving the steps of:

(a)—providing an interface program and using it to carry out the following substeps:
  receiving from the first program messages destined for the second program,
  passing said messages to the second program, and
  monitoring and storing indications regarding conditions prevailing in the computer at the time the messages are received or passed; and
(b)—providing a control program and using it for dynamically changing the indications monitored and stored by the interface component.

Preferably, step (b) involves using the control program to set a parameter in a memory area accessible to the interface component, and accessing this parameter with the interface component and determining the indications to be monitored and stored in dependence on the value of this parameter. Advantageously, the aforesaid parameter is accessed by said interface component each time it receives/passes messages.

The invention is useful for tracing the interaction between programs, and the ability to dynamically change the indications monitored is particularly useful in testing and/or debugging. The invention may also be used for tuning programs to the computer, that is, adapting programs to a specific technical environment. Furthermore, the invention allows for real time monitoring of computer parameters during the operation of the computer running the programs. It is notably useful for telecommunications applications or for other such types of applications that require high reliability; indeed, in situ monitoring helps in detecting, preventing or repairing malfunctions. The invention may also be used for distributed applications, or for multiprocessor applications. In this cases, it will provide a valuable tool for checking the operation of the applications.

BRIEF DESCRIPTION OF THE DRAWINGS

A method embodying the invention for monitoring the interaction between two programs will now be described, by way of non-limiting example, with reference to the accompanying diagrammatric drawings, in which.

BEST MODE OF CARRYING OUT THE INVENTION

Figure 1:
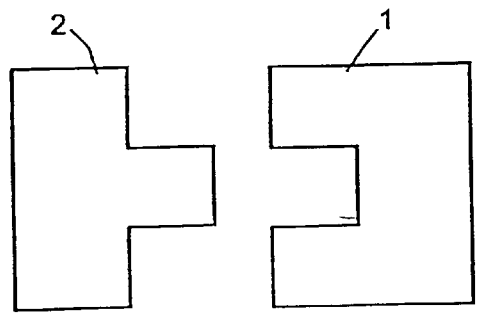
FIG. 1 is a schematic view of the interaction of two programs, as practised in the prior art.
Figure 3:
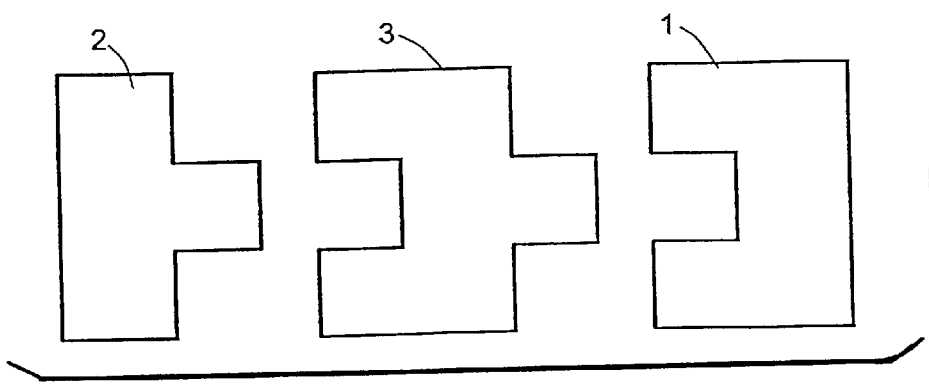
FIG. 3 is a schematic view similar to FIG. 1, showing the interposition of a monitoring component between the two programs in accordance with the invention.

FIG. 3 is a schematic view similar to FIG. 1 showing two interacting programs 1 and 2; in accordance with the invention, in FIG. 3 an interface component 3 is operatively interposed between programs 1 and 2. This component 3 is arranged to receive any message or call—such as commands or requests—issued by the first program 1, and normally destinated for the second program 2; the interface component 3 then passes on the messages to the second program 2 and in due course returns the response issued by the second program back to the first program. Thus, interface component 3 hides the second program 2 from the first program 1, and the interface component 3 will behave with respect to first program 1 as if it were the second program 2; at the same time, the operation of the second program 2 will be the same as in the prior art arrangement of FIG. 1. The presence of component 3 is thus effectively transparent to both the first and second programs.

The interface component 3 is also arranged to monitor computer parameters, and/or trace messages coming from first program 1.

The operation of the first and second programs of 1, 2 FIG. 3 will thus be exactly the same as the operation of the first and second programs 1 and 2 in the prior art arrangement of FIG. 1. However, the invention provides monitoring of the interaction between the programs and/or of the parameters of the computer.

In a preferred embodiment, the invention can be applied to the monitoring of the interaction of a user application with a library—hereafter called the original library. To this end, there is provided a bridge library that comprises for each routine of the original library, bridge code that allows the corresponding routine of the original library to be used, but hides its name.

There is also provided a spy library, that comprises for each routine of the original library, spy code that presents the same name as the corresponding routine of the original library and, by calling that routine through the bridge library, makes the same functionality available. Thus any user application may be linked to spy code, just as if it were a routine of the original library.

The bridge and spy libraries together make up the interface component of 3 FIG. 3.

In a preferred embodiment of the invention, the bridge or spy library is provided with means for dynamic or selective tracing or monitoring, in which the depth of monitoring or tracing can be controlled. This helps in adapting the level of monitoring or tracing to the needs of a user.

By way of example, an implementation will now be described of the interface component 3 for interposition between the user application binary "object" and library binary "PR.a" of FIG. 2 in relation to the library routine PRINT.

Figure 4:
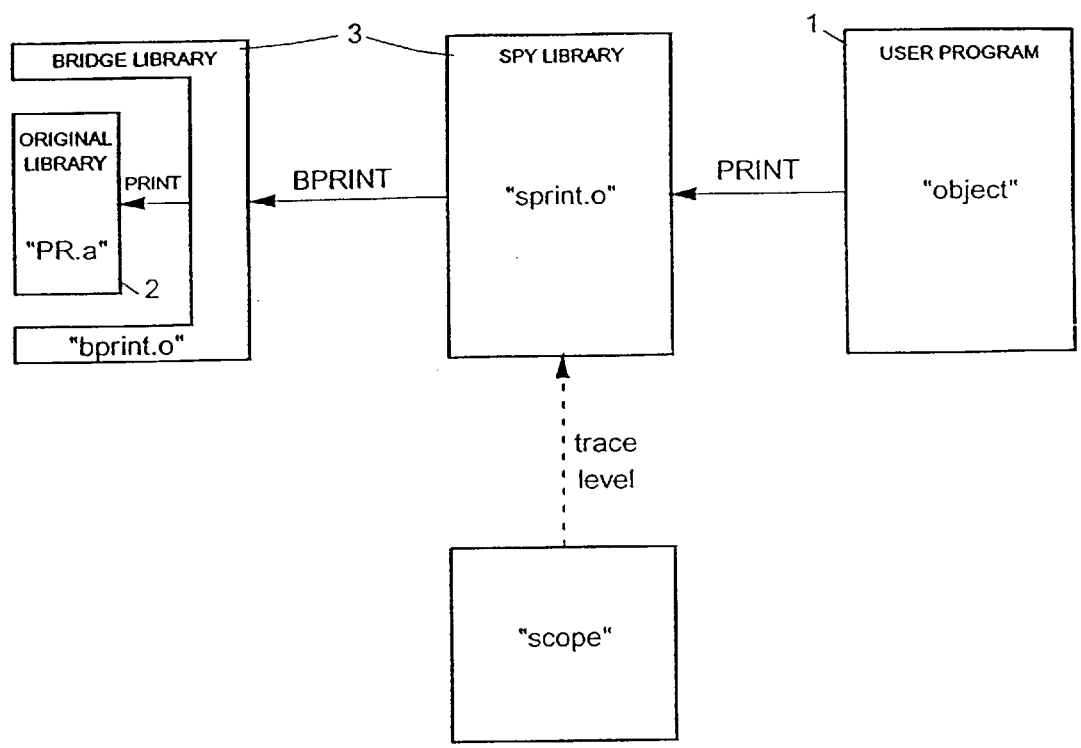
FIG. 4 is a diagram illustrating the operation of an implementation of the FIG. 3 arrangement.

In this implementation, the interface component 3 comprises a bridge library binary "bprint.o" and a spy library binary "sprint.o". As illustrated in FIG. 4, the binary "sprint.o" is arranged to respond to a call PRINT issued by the user program binary "object" by issuing a call BPRINT which is picked up by the bridge library binary "bprint.o" and passed on as a "PRINT" call to the original print library "PR.a", causing the routine PRINT to execute. The PRINT call issued by the user program "object" is hidden from the original library "PR.a" by the manner in which the libraries "PR.a" and "bprint.o" are linked (this 'hiding' being implemented by a standard command available with most modem compiler/linker programs); the hiding of library "PR.a" by library "bprint.o" is depicted in FIG. 4 by the shape of the "bprint.o" component.

The spy library "sprint.o" also includes code for monitoring and tracing, the level of this monitoring being modifiable through a 'scope' program that uses a memory area shared with sprint.o to pass the latter parameters for controlling its monitoring level. Upon the spy library receiving a call from the user program; it checks these parameters, implements the monitoring/tracing to the level required, and then passes on the call, in appropriate form, to the bridge library.

Figure 5:
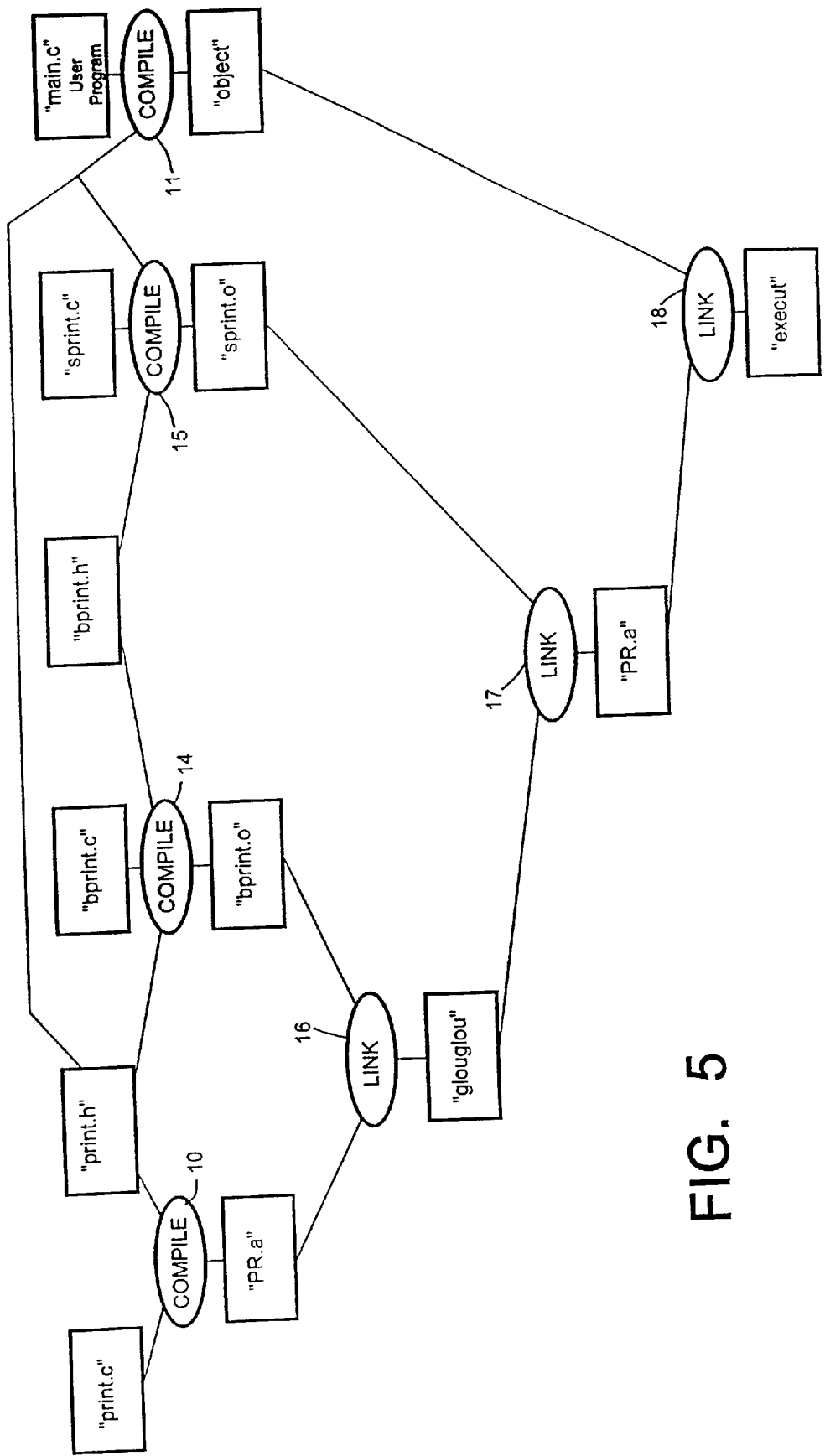
FIG. 5 is a diagrammatic illustration of the compiling and linking steps involved in producing the FIG. 4 implementation of the FIG. 3 arrangement.

FIG. 5 illustrates the various program files and compiling and linking operations involved in implementing the above example. The original library binary "PR.a" and user program binary "object" are produced as already described with respect to FIG. 2. The bridge library binary "bprint.o" is produced by compiling (step 14) a bridge library source file "bprint.c", this latter including references to header files "print.h" and "bprint.h". The spy library binary "sprint.o" is produced by compiling (step 15) a spy library source file "sprint.c", this latter including references to header files "print.h" and "bprint.h". The original library "PR.a" and bridge library "bprint.o" are linked (step 16) to produce binary "glouglou" with "PR.a" being hidden in the process. The binary "glouglou" and spy library "sprint.o" are then linked (step 17) to produce a new library "PR.a" (confusion with the original library file of the same name can be simply avoided by storing them in different directories). Finally, the new library "PR.a" is linked (step 18) to the user program "object" to produce the executable user program.

Figure 2:
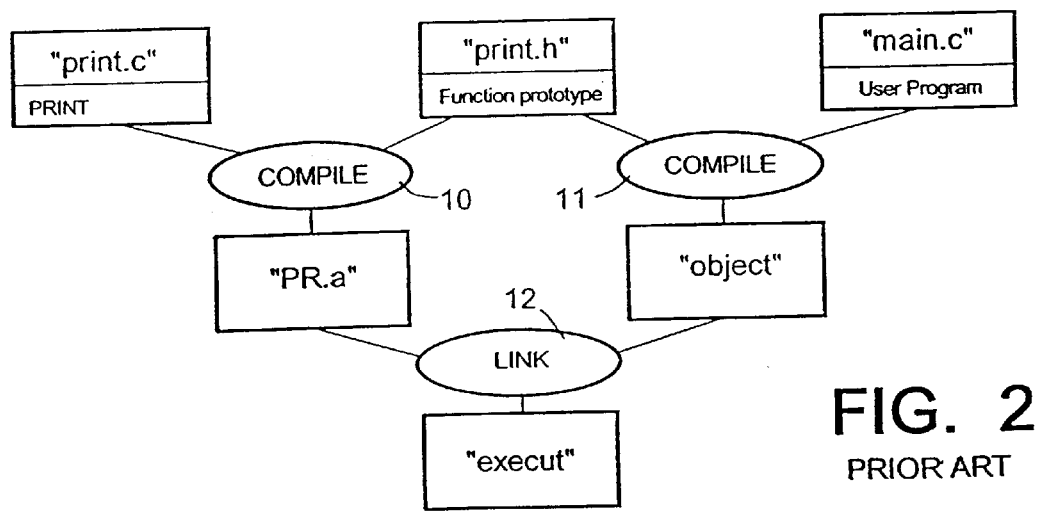
FIG. 2 is a diagrammatic illustration of the compiling and linking steps involved in producing an implementation of the FIG. 1 arrangement.

From a comparison of FIGS. 2 and 5, it can be seen that the present invention provides tracing and/or monitoring, without requiring any change in the source code of the original library "print.c" or in the source code of the user application "main.c". This reduces the time necessary for development of new applications. The invention also provides a dynamic choice of the tracing or monitoring level, even when the compiled programs are running. Since the system is dynamic, performance degradations are reduced.

Annexed to this present description is a more detailed version of the source code for the foregoing embodiment of the invention. This example is written in the C language and was developed on a HP-UX workstation function.

The example comprises six parts, that is:

code for the original library code for the bridge library code for the spy library code for the user application code for the scope program a script for activating these programs Each of the first four parts comprises a source code together with a script for producing the output of the part.

The example provided in the annex is only intended to trace the interaction between the user application and the print library. Obviously, different user programs could be used, and the tracing could be completed, or replaced by the monitoring of computer parameters.

In the examples given above, the computer parameters or indications regarding the conditions prevailing in the computer are stored in a file. Obviously, instead of "storing" these indications in a file, one could "store" them by sending them to a display, where they would be displayed.

It will be appreciated that although the above-described embodiment of the invention relates to tracing the interaction between a user application and a library, the invention can be applied to any interacting programs. It will further be appreciated that more than one instance of the final executable program may be simultaneously run (such an instance being generally referred to as a process).

Annex 1

This Annex 1 relates to the original library. In the example, it comprises only a PRINT routine. "Print.c" is the C language code for the library. "Print.h" holds the function prototype for PRINT and 'go' is the script for compiling print.c with print.h and creating a binary library PR.a.

--- print.c

```
#include <print.h>
void PRINT(int number)
{
printf("This.is the lib (%d)\n",number);
return;
}
```
print.h

```
extern void PRINT(int);
```
go

```
cc -Aa -I. print.c. -c print.o
ar cr PR.a print.o
```
---

Annex 2

This Annex 2 relates to the bridge library. "hprint.c" is the C-language source code for the library and "bprint.h" holds the function prototype for function BPRINT. "go" is the script for compiling bprint.c, with print.h and bprint.h to create an object bridge library "bprint.o"; "brpint.o" is linked to "PR.a" so as to create an intermediary library "glouglou", while hiding the PRINT routine. Thus, there is provided through "glouglou" a call to the original library routine PRINT, but this library routine is hidden in "glouglou", and only BPRINT can be called from externally of "glouglou".

--- bprint.c

```
#include <bprint.h>
#include <print.h>
void BPRINT(int number)
{
printf("This is the bridge (%d)\n",number);
PRINT(number);
return;
}
```
bprint.h

```
extern void BPRINT(int );
```
go

```
cc -Aa -I. -I../olib bprint.c -c bprint.o
ar -x ../olib/PR.a
ld -r -h PRINT * .o -o glouglou
```
---

Annex 3

This Annex 3 relates to the spy library. "sprint.c" is the C-language source code for the library. In this example, the spy library provides tracing of the interaction between the user application and the print library; the spy library first checks the tracing level, and writes the results of the tracing in a trace file called "/tmp/spyTrace". In the example, for the sake of simplicity, only very simple tracing levels are provided, as explained below when describing annex 5. After having traced the interaction, the spy library calls BPRINT: thus, the spy library logs the function call it receives to the bridge library, where it is ultimately passed to the original print library. "sprint.h" holds the function prototype for the routine PRINT. "go" is the script for compiling sprint.c with print.h and bprint.h to create an object spy library sprint.o; sprint.o is linked to glouglou, so as to create a library PR.a. The name of the library is the same as the original library, so that the user application will transparently use the assembly of the original library with the bridge library and the spy library.

--- sprint.c

```
#include <bprint.h>
#include <print.h>
#include <stdio.h>
#include <sys/time.h>
#include <sys/ipc.h>
#include <sys/types.h>
#include <sys/shm.h>
#include <../scope/scope.h>
int errno;
int level = TL_TRACE_NOT_SET;
char *ptr;
key_t key;
FILE *out, *file;
void set_trace_level ( )
int shmem,value,i;
    /* Scan if tracelevel should be changed * /
if (level == TL_TRACE_NOT_SET)
    {
    printf("Init tracing level \n");
    out = fopen("/tmp/spyTrace","a");
    if ( (int) out != 0
        {
        fprintf(out, "\n\t\tStarting...\n\t\t**********\n")
        }
    fflush(out);
    file = fopen(IFILE,"a");
    if ( (int) file == 0)
        printf("Can't open file (%d)\n".errno);
    key = ftok(IFILE,ID);
    if - (key == (key_t) -1)
        printf("Can't get key (%d)\n",errno);
    shmem = shmget( key, 0,0);
    ptr = shmat(shmem,0,0);
    }
level = *ptr;
}
void PRINT(int number)
{
set_trace_level ( );
/* printf("macro results : %d %d\n",M_TRACE_FUNCTION,
M_TRACE_PARAMS); */
if M_TRACE_FUNCTION
fprintf(out,"This is the spy : function PRINT\n");
if M_TRACE_PARANS
fprintf(out,"This is the spy : number is %d\n",number);
fflush(out);
BPRINT(number);
return;
}
```
go

```
cc -Aa -I../olib -I../blib -D_INCLUDE_POSIX_SOURCE
-D_INCLUDE_XOPEN_SOURCE sprin
c -c sprint.o
ld -r ../blib/glouglou sprint.o -o both2.o.tmp
mv both2.o.tmp both2.o
ar cr PR.a both2.o
```
---

Annex 4

This Annex 4 relates to the user application. "main.c" is the C-language source code for the application, and is mainly intended to print the sentence "On y va". "go" is the script for compiling main.c to create main and an instrumented version of main called imain; these use the library "PR.a" created as explained in Annex 3.

main.c

```
#include <print.h>
main( )
{
int i;
printf("On y va!\n");
while (1 )
    {
    getchar( );
    PRINT(2);
    }
}
go echo "Making main"
cc -g -Aa -I../olib main.c ../olib/PR.a -o main
echo "Making imain"
cc -g -Aa -I../olib main.c ../slibPR.a -o imain
```

Annex 5

This Annex 5 relates to the 'scope' program for dynamic change of the tracing level. "scope.c" is the C-language source code for the program. Only three tracing levels are provided in this example, that is, no tracing (level 1), tracing function calls (level 2) or tracing function parameters (level 4). Other tracing levels could be added. "scope.h" holds the function prototype. "go" is the script for compiling scope.c to create the scope interprocess function.

scope.c

```
#include <stdio.h>
#include <sys/time.h>
#include <sys/ipc.h>
#include <sys/types.h>
#include <sys/shm.h>
#include "scope.h"
int errno;
FILE * out=0;
trace_level_t level=TL_TRACE_NOT_SET;
main( )
{
key_t key;
FILE * file;
int shmem,level,i.;
char *ptr;
    if (out = fopen("/tmp/spyTrace", "a"))
        {
        level = TL_NO_TRACE;
        fprintf(out,"\n\t\tStarting...\n\t\t***********\n");
        }
    printf ( "starting scope! \n");
    file = fopen(IFILE,'a");
    if ( file == -1)
        printf('Can't open file (%d)\n'",errno);
    key = ftok(IFILE,ID);
    if (key == (key_t) -1)
        {
        printf("Can't get key (%d)\n",errno);
        return(-1);
        }
    shmem=shmget (key,10,IPC_CREAT|IPC_ExCL|066.6);
    if (shmem == -1);
        {
        printf("pb, petit pb .......\n");
        return(-1);
        }
    ptr = shmat(shmem,0,0);
    *ptr = TL_NO_TRACE;
    printf("Ready to trace\n");
```

-continued

```
    while (1)
        {
        printf("1 : NO TRACING , 2: FUNCTION , 4: PARAMETERS\n");
        printf("Which tracing level ? >");
        scanf("%d",&i);
        printf("Setting to %d \n",i);
        *ptr = i;
        }
}
``` scope.h

```
#define SET_TRACE_LEVEL set_trace_level ( );
#define OUT           fprintf(out,
#define IFILE "\tmp\cntlIpcF"
#define ID 0x77
typedef enum(  TL_TRACE_NOT_SET =   0x000,
               TL_NO_TRACE =        0x001,
               TL_TRACE_FUNCTION =  0x002,
               TL_TRACE_PARAMS =    0x004,
               TL_TRACE_RESULT =    0x080,
               TL_TRACE_ALL =       0x0ff,
               TL_TRACE_DEBUG =     0x1ff)trace_level_t;
#define M_TRACE_FUNCTION  (level & TL_TRACE_FUNCTION)
#define M_TRACE_PARAMS    (level & TL_TRACE_PARAMS )
go freesm
echo "Making le scope"
cc -g -Aa -D_INCLUDE_POSIX_SOURCE
-D_INCLUDE_XOPEN_SOURCE scope.c -o scope
note
``` the freesm command is used to free shared memory segments

Annex 6

This Annex 6 relates to the script for activating the complete application, and running the user application.

lets

```
#!/bin/ksh
set -x
DIRS="olib blib slib scope prog "
for dir in $DIRS
    do
    cd /users/pierres/pat/spy/$dir
    echo "executing go in $dir"
    go
    cd ..
    done
cd /users/pierres/pat/spy
freesm
hpterm -e tail -f /tmp/spyTrace &
hpterm -e scope/scope &
hpterm -e prog/imain &
```

What is claimed is:

1. A method of automatically storing indications regarding conditions prevailing in a computer running a first program that makes use of a second program, said method involving the steps of:

(a)—providing an interface program and using it to carry out the following substeps:
receiving from the first program messages destined for the second program,
passing said messages to the second program,
reading a trace level flag,
executing a set of instructions for monitoring and storing indications regarding conditions prevailing in the computer at the time the messages are received or passed, said set depending on the value of the trace level flag; and (b)—providing a control program for dynamically changing the value of the trace level flag.

2. A method according to claim 1, wherein step (b) involves using said control program to set the flag value in a memory area accessible to said interface component.

3. A method according to claim 2, wherein said flag is accessed by said interface component each time it receives/passes said messages.

4. A method according to claim 1, wherein in step (a) said interface component is further used to carry out additional substeps of receiving messages from the second program destined for the first program and passing them to the first program.

5. A method according to claim 1, in step (a) providing said interface component is effected by:

providing a bridge program allowing use of said second program whilst hiding it from said first program;

providing a spy program for monitoring and storing said indications, for receiving said messages from the first program, and for passing these messages to the bridge program.

6. A method according to claim 5, wherein the spy program has at least one routine with the same name as a routine of said second program.

7. A method according to claim 5, wherein said step of providing the interface component further involves:

linking an object version of said bridge program with a compiled version of said second program to produce an intermediate program;

linking an object version of said spy program with the intermediate program to produce a further program having the name and functionalities of said second program, but allowing monitoring and storing of said indications; and linking a compiled version of said user application with said further program.

8. A method according to claim 1, wherein said second program is a library of routines at least one of which is used by said first program.

9. A method according to claim 1, wherein said indications regarding conditions prevailing in the computer, comprise indications of the function calls made by the first program.

\* \* \* \* \*